Feb. 14, 1928.

J. E. BODA 1,659,234

WHEELED PLOW

Filed Jan. 10, 1927   3 Sheets-Sheet 1

Inventor:
Joseph E. Boda.
By Fisher, Towle, Clapp & Soans, Attys.

Feb. 14, 1928.

J. E. BODA 1,659,234

WHEELED PLOW

Filed Jan. 10, 1927     3 Sheets-Sheet 2

Inventor.
Joseph E. Boda
By Fisher, Towle, Clapp & Soans, Attys.

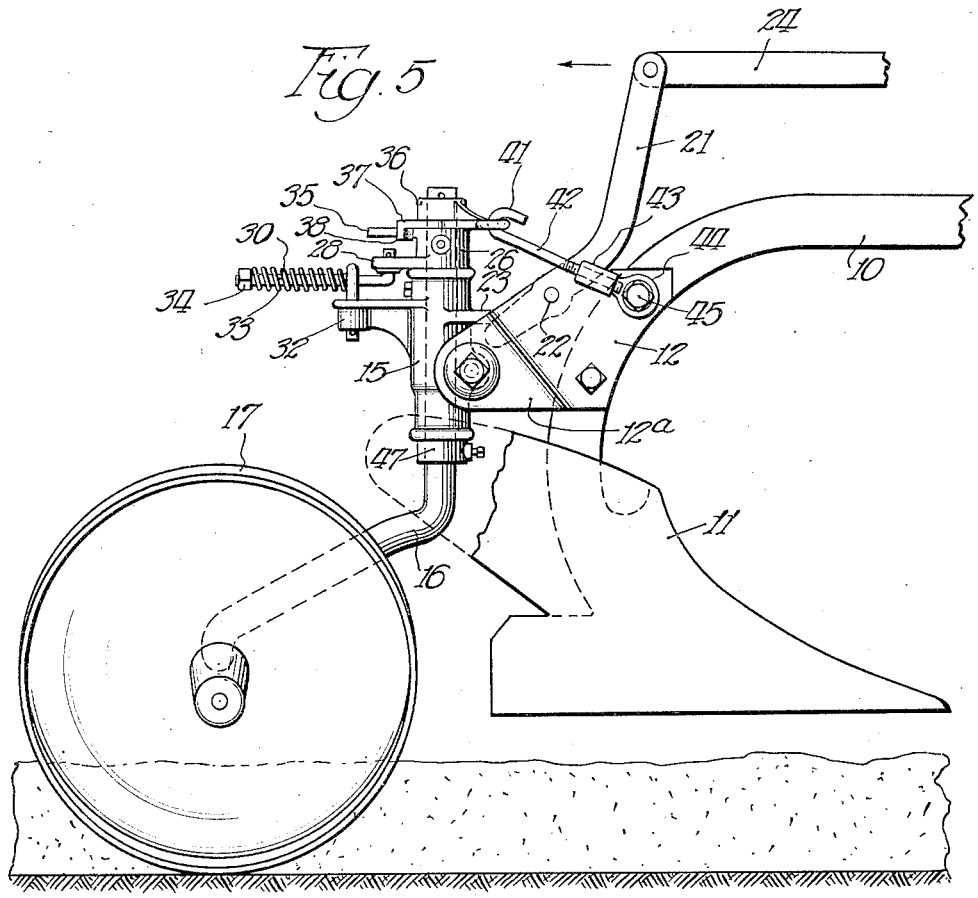

Patented Feb. 14, 1928.

1,659,234

UNITED STATES PATENT OFFICE.

JOSEPH E. BODA, OF DIXON, ILLINOIS, ASSIGNOR TO J. I. CASE THRESHING MACHINE COMPANY, OF RACINE, WISCONSIN, A CORPORATION OF WISCONSIN.

WHEELED PLOW.

Application filed January 10, 1927. Serial No. 160,030.

This invention relates to the general art of wheeled plows, and has reference more particularly to that type of wheeled plows employing a trailing caster wheel that serves to support the rear end of the plow beam or frame structure at a sufficient elevation to maintain the plow shares or discs clear of the ground while traveling to and from the field, and, during working, travels in the furrow behind the plow or the rearmost plow of the gang.

One object of the invention is to provide an improved automatic control governing the swiveling movements of the caster wheel, operating normally to hold the latter in accurate trailing position in the furrow, and at the same time permitting the wheel to swivel in its spindle bearing to the position required when turning a corner or traveling in a curved direction. Another object is to provide an improved lock mechanism which will be inoperative when the plow is raised so as to permit the caster wheel to swivel in its spindle bearing when the plow is turning a corner or traveling in a curved path, and will automatically assume an operative position and condition when the plow is lowered to working position and will then act to hold the caster wheel against swiveling under its side thrust against the landside of the furrow created by the camming action of the mold board or oblique plow disc; this automatic lock being especially useful in connection with disc plows and with mold board plows having a short landside.

Other objects and attendant advantages of the invention will be apparent to persons skilled in the art as the same becomes better understood by reference to the following detailed description taken in connection with the accompanying drawings, wherein I have illustrated a practical and approved embodiment of the invention, and in which—

Fig. 5 is a side elevation of the rear portion of Fig. 1, viewed from the side opposite that shown in Fig. 1;

Fig. 6 is a detail vertical section through the caster wheel spindle and its bearing, also showing the lower portion of the lever for tilting the bearing and spindle from inclined to vertical position to raise the plow out of the ground.

Figure 1:
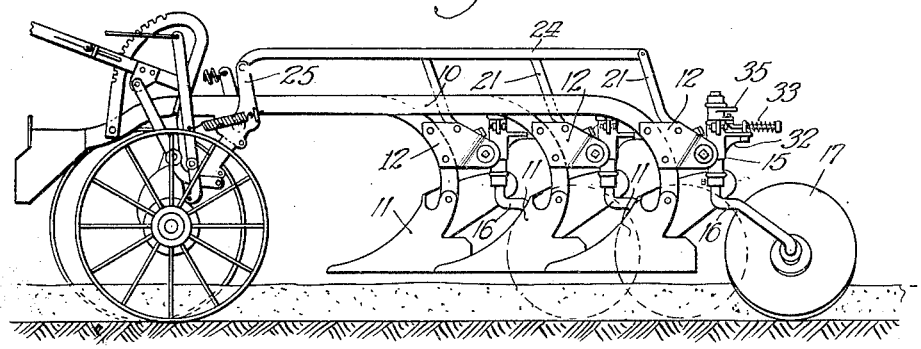
Fig. 1 is a side elevation of a gang plow equipped with my present improvement, showing the plows raised and the caster wheel spindle and its bearing in vertical position.

The invention is herein illustrated as applied to a gang plow of the type shown in Letters Patent to Robert C. Caughey No. 1,522,363 dated January 6, 1925; the improvements forming the subject-matter of the invention having to do with the mechanism for mounting and controlling the trailing caster wheel and for raising and lowering the rear end of the plow frame relatively to said wheel. The mechanism for supporting and raising and lowering the forward end of the frame may be assumed to be identical with the mechanism disclosed in the aforesaid Letters Patent, although the subject-matter of the present improvement is not related to or dependent upon such mechanism.

Referring to the drawing, 10 designates as an entirety the plow frame, to which the plow bottoms 11 are rigidly secured; said frame, in the case of a gang plow, comprising a plurality of parallel beams to each of which a plow bottom is attached, as well understood in the art.

To the rear downwardly curved portion of the beam carrying the rearmost plow bottom 11 are rigidly bolted a pair of rearwardly extending bracket plates 12 laterally offset at their rearmost portions as shown at 12$^a$. Journaled on a bolt 13 extending between the bracket arms 12$^a$ is a sleeve 14, integral with which and disposed at right angles thereto, is a sleeve 15 that constitutes a relatively long bearing for the upper portion of a bent spindle 16 of the trailing caster wheel 17. Since the swivel bearing 15 of the spindle is disposed forwardly of the vertical plane of the axle bearing of the caster wheel, the weight of the plow frame and plow bottoms causes the spindle bearing 15 to rock on its horizontal axis 13 to the position illustrated in Fig. 2, the extent of this tilting movement being limited by the contact of an adjusting screw 18 mounted in a lug 19 on the bearing member 15 with a fixed stop lug 20 attached to one of the bracket plates 12. This position of the spindle bearing 15 corresponds to the working position of the plow bottoms. The rear end of the plow frame and bottoms is elevated through a simple mechanism comprising a lever 21 fulcrumed at 22 between the bracket plates 12 and having its lower end in thrust engagement with a notched lug 23 (Fig. 6) on the side of the spindle bearing 15 above the horizontal pivot 13. The upper end of the lever 21 is connected by a link 24 to the upper end of an arm 25 that is rigidly secured to or formed as a part of the land wheel axle, which latter is manipulated so as to raise and lower the front portion of the plow frame through mechanism not herein shown but fully shown and described in the aforesaid Patent No. 1,522,363. When the arm 25 is swung to the left, viewing Fig. 1, the link 24 is drawn in the same direction, and through the lever 21 the caster wheel spindle bearing and spindle are shifted from the inclined position illustrated in Fig. 2 to the vertical position shown in Figs. 1, 4 and 5, thereby elevating the rear portion of the plow frame simultaneously with the elevation of its front portion.

The rearwardly extending horizontal portion of the caster wheel spindle 16 is yieldingly held in or parallel with the line of movement of the plow bottom 11, so that the caster wheel will trail the plow bottom, by an automatic spring-actuated device which is capable of yielding to permit the necessary swiveling movement of the caster wheel in either direction when trailing the plow frame around a corner or on any other curved path. This mechanism comprises a collar 26 fastened to the spindle 16 by a cross-pin 27 just above the sleeve bearing 15, a short arm 28 projecting rearwardly from the collar 26, formed with an aperture 29, a link 30 having a bent end engaged with the aperture 29, an I-bolt 31 swiveled in a bracket 32 on the bearing 15, through which I-bolt the link 30 extends, a spring 33 encircling the link 30 and footed against the I-bolt 31, and an adjusting nut 34 on the rear end of the link 30 forming an abutment for the other ends of the spring 33.

Figure 4:
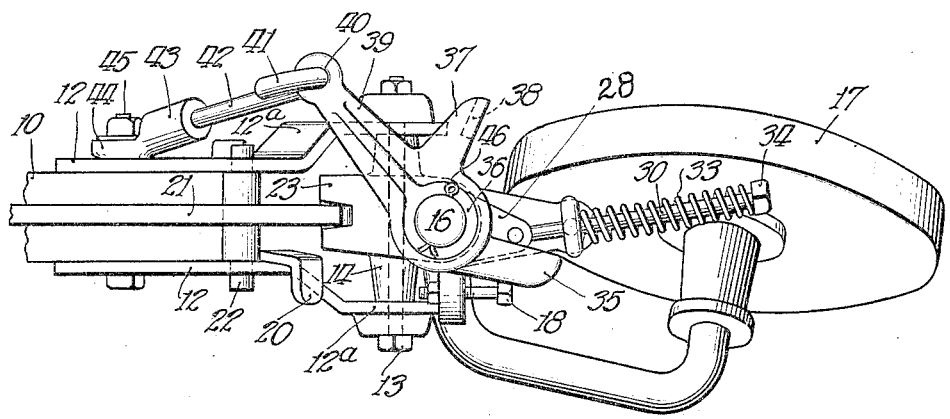
Fig. 4 is a top plan view of the rear portion of Fig. 1, showing the open or inoperative position of the lock and also illustrating the action of the automatic spring mechanism controlling the swiveling action of the caster wheel.

The thrust of the spring 33, of course, tends to draw the arm 28 and the link 30 into alignment, but through its yielding capacity permits the swiveling movement of the caster wheel necessary to a curved travel of the plow, automatically drawing it back into trailing alignment when the plow resumes a rectilinear path. Fig. 4 illustrates this last-described action, showing the position assumed by the caster wheel and its aligning mechanism when the plow is making a left turn.

Describing next the mechanism for locking the caster wheel spindle 16 against swiveling in its bearing 15 with consequent angling tendency of the wheel itself relatively to the direction of travel under the reaction thrust of the furrow wall on the wheel when plowing, 35 designates a radial stop arm that is rigid with the spindle 16, being conveniently formed on the upper portion of the collar 26 above the arm 28. Turnable on the upper end of the spindle 16 above the collar 26 is a hub 36 from which extends a substantially radial arm 37 formed on its free end with a depending stop lug 38 that lies in the horizontal plane of the stop arm 35, as clearly shown in Fig. 5. Integral with the hub 36 and arm 37 is a somewhat longer arm 39 lying at approximately a right angle to the arm 38 and formed in its free end with an aperture 40 to receive the hook 41 of a rod 42. This latter at its rear end is threaded for adjustable connection to a shank sleeve 43, the rear end of the latter having an eye 44 that is pivotally attached to one of the bracket plates 12 by a pivot bolt 45. The hub 36 is confined on the spindle 16 as by a cotter pin 46, and the lower end of the spindle bearing 15 is supported on the spindle by a collar 47 keyed to the spindle.

Figure 2:
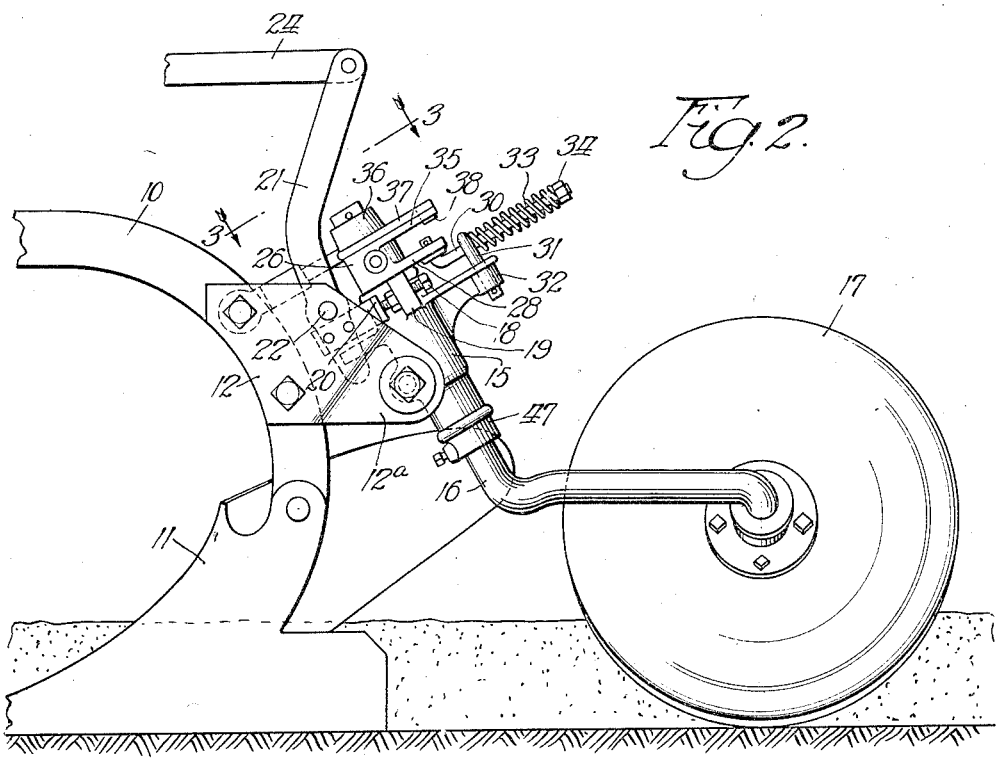
Fig. 2 is a side elevation of the rear portion of Fig. 1, showing the rearmost plow in working position and illustrating the oblique or inclined position of the caster wheel spindle and its bearing, and also showing an operative position of the mechanism which locks the caster wheel against swiveling under the thrust of the landside of the furrow.
Figure 3:
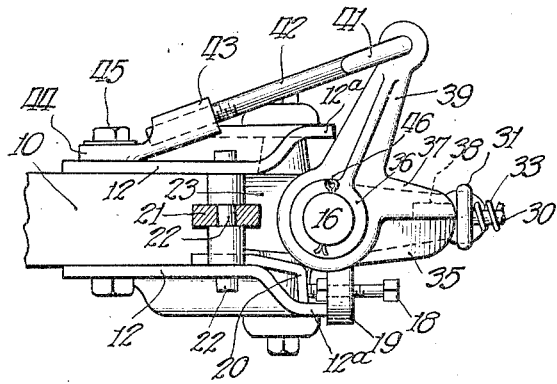
Fig. 3 is a top view of the caster wheel controlling and locking mechanism shown in Fig. 2, viewed in a direction parallel with the axis of the spindle bearing and spindle in the latter figure.

In the working position of the plow illustrated in Figs. 2 and 3, the lever 21 has been swung rearwardly permitting the spindle bearing 15 of the caster wheel to swing downwardly and forwardly to the inclined position shown in Fig. 2, thus lowering the frame and plow bodies. This angular movement of the spindle bearing causes the arm 39 to swing rearwardly, under the thrust of the link 42, to the position shown in Fig. 3, bringing the stop member 38 into abutment with the stop member 35 that is fast on the spindle. This effectively locks the spindle 16 against turning in a counter-clockwise direction viewing Fig. 3, since the arm 35 is fast on the spindle and is locked against movement in that direction by the stop lug 38 on the co-operating arm 37. Hence, the caster wheel 17 is effectively locked against yielding to the reaction thrust or pressure of the vertical wall of the furrow which, otherwise, might cause the wheel to angle in a direction that would cause it to ride up out of the furrow and onto the land. When, however, the lever 21 is swung in the reverse direction or to the left, the spindle bearing and spindle are shifted to the vertical position as shown in Figs. 1 and 5, and the pull of the link 42 on the arm 39 separates and spreads the stop members 35 and 38, as clearly shown in Fig. 4, thus permitting the caster wheel to angle in either direction relatively to the line of travel so that the plow may readily turn a corner or travel any curved path. By thus locking the caster wheel to resist the landside thrust caused by the lateral thrust on the plow bodies, it is practicable to use a much shorter vertical mold board on the rear plow than has heretofore been practicable on plows using a trailing caster wheel.

I have herein shown and described, for purposes of illustration, one simple and practical embodiment of the invention, but it is manifest that changes in the details of structure and arrangement may be resorted to without involving any departure from the principle of the invention or sacrificing any of the utilities and advantages thereof. Hence, I do not limit the invention to the particular mechanism disclosed, but reserve all such variations, modifications and mechanical equivalents as fall within the spirit and purview of the claims.

I claim—

1. In a plow, the combination with a plow frame, and a trailing caster wheel, of an upright spindle bearing member mounted on the rear end of said frame, a caster wheel spindle formed with a laterally bent axle for said wheel and with a forwardly offset upwardly extending portion journaled in said bearing member, and yieldable elastic means operating upon said spindle and said bearing member in a manner to oppose relative turning movements of said parts and maintain said caster wheel in alinement with said plow frame; said yieldable elastic means comprising an arm fast on the spindle, a second arm fast on the bearing member, an apertured spring abutment member on said second arm, a rod pivoted at one end to said first-named arm and extending through said spring abutment member, a nut on the other end of said rod, and a compression spring encircling said rod and confined endwise between said abutment member and said nut.

2. In a plow, the combination with a plow frame, and a trailing caster wheel, of a caster wheel spindle having a forwardly offset upwardly extending portion, a bearing member for said upwardly extending portion pivoted horizontally on said plow frame to swing between a vertical position and a forwardly inclined position, means for shifting said bearing member between said positions, and means independent of said shifting means for locking said spindle against turning in said bearing member under side pressure on said wheel automatically brought into action when said bearing member moves from vertical to inclined position and automatically thrown out of action when said bearing member moves from inclined to vertical position.

3. In a plow, the combination with a plow frame, and a trailing caster wheel, of a caster wheel spindle having a forwardly offset upwardly extending portion, a bearing member for said upwardly extending portion pivoted horizontally on said plow frame to swing between a vertical position wherein it holds said plow frame elevated and a forwardly inclined position wherein it holds said plow frame lowered, means for shifting said bearing member between said positions, and means for locking said spindle against turning in said bearing member operative in the inclined position of said bearing member and inoperative in the vertical position of the latter, said locking means comprising a stop member fast with said spindle, a co-operating stop member, and connections between said plow frame and said co-operating stop member operating to shift the latter into and out of engagement with said first-named stop member under forward and rearward swinging movements respectively of said bearing member.

4. An embodiment of claim 3, wherein the first-named stop member consists of an arm fast on the spindle, and the co-operating stop member is carried by an arm swiveled on the spindle.

5. A form of claim 3, wherein the first-named stop member consists of an arm fast on the spindle, the co-operating stop member is carried by an arm swiveled on the spindle, and the connections between the plow frame and the co-operating stop member include an arm rigid with the co-operating stop member and a link attached at one end to the plow frame and at its other end pivoted to said last-named arm.

JOSEPH E. BODA.